United States Patent [19]

Wakabayashi et al.

[11] Patent Number: 4,657,978

[45] Date of Patent: Apr. 14, 1987

[54] CURABLE COMPOSITION

[75] Inventors: Hiroshi Wakabayashi; Joe Kawamura, both of Kobe, Japan

[73] Assignee: Kanegafuchi Kagaku Kogyo Kabushiki Kaisha, Osaka, Japan

[21] Appl. No.: 801,999

[22] Filed: Nov. 25, 1985

[30] Foreign Application Priority Data

Nov. 26, 1984 [JP] Japan ................................ 59-249027

[51] Int. Cl.$^4$ ................................................ C08F 8/00
[52] U.S. Cl. .................................... 525/100; 525/104; 525/106; 525/288; 524/284; 524/377; 524/386; 524/388; 524/391; 528/17; 528/23
[58] Field of Search ............... 525/100, 104, 106, 288; 524/284, 377, 386, 388, 391; 528/17, 23

[56] References Cited

U.S. PATENT DOCUMENTS

| | | | |
|---|---|---|---|
| 4,278,783 | 7/1981 | Taniyama et al. | 525/100 |
| 4,507,437 | 3/1985 | Kato et al. | 525/106 |
| 4,518,726 | 5/1985 | Kato et al. | 525/100 |

Primary Examiner—Melvin I. Marquis
Attorney, Agent, or Firm—Armstrong, Nikaido, Marmelstein & Kubovcik

[57] ABSTRACT

A curable composition comprising an organic polymer containing at least one silicon-containing hydrolyzable group in the polymer molecule, an acid phosphoric acid compound and an organozirconium compound. The curable composition can be rapidly cured and has an improved pot life both in open system and in closed system.

6 Claims, No Drawings

CURABLE COMPOSITION

BACKGROUND OF THE INVENTION

The present invention relates to a curable composition having an improved pot life, and particularly relates to a curable composition comprising an organic polymer which contains at least one silicon-containing hydrolyzable group in the polymer molecule and a curing agent.

It has been known that vinyl resins containing a hydrolyzable silyl group at an end of the main chain or in a branched chain have not only the excellent properties of vinyl resins such as high gloss, weatherability and discoloring resistance, but also an improved adhesive property to inorganic materials due to the hydrolyzable silyl group. Further when crosslinked at normal temperature in the presence of water, particularly moisture in air, to form a dense network structure, the cured resins have excellent properties such as high chemical resistance, water resistance, heat stability hardness and weatherability (Japanese Unexamined Patent Publication (Tokkyo Kokai) No. 36395/1979). Though those vinyl resins containing a hydrolyzable silyl group (hereinafter referred to as "hydrolyzable-silyl group-containing vinyl resins") can be cured without a curing agent, in such a case, the curing step must carried out at a high temperature or the curing rate at a low temperature is slow. Accordingly the curing step is carried out in general at a low temperature with a curing agent, whereby excellent coating films having the above-mentioned properties can be obtained. The hydrolyzable-silyl group-containing vinyl resins can provide excellent cured resins by using a curing agent, as mentioned above. The vinyl resins, particularly vinyl resins which have a silyl group containing three hydrolyzable groups, however, have a problem in that when the resins are blended with a curing agent, the blended compositions have a shorter pot life, particularly pot life in open system. For improving the pot life of the vinyl resins, there was proposed, for instance, a process described in U.S. Pat. No. 4,043,953. In that process, pot life in the presence of a curing agent is improved by adding a hydrolyzable reactive silane monomer of the formula:

wherein X is an organic group having 1 to 12 carbon atoms, R is an alkyl group having 1 to 5 carbon atoms such as methyl, ethyl, 2-methoxymethyl or 2-ethoxyethyl, "k" is 0, 1 or 2, to an organosilane polymer prepared by copolymerizing a monomer containing $CH_2=C<$ excepting a monomer containing an active hydrogen group such as hydroxyl group, carboxylic group or amido group with an organosilane monomer such as acrylate alkoxysilane, methacrylate alkoxysilane or vinylalkoxysilane, in which the amount of the hydrolyzable reactive silane monomer is 0.5 to 15% by weight on the basis of the organosilane polymer. The curing agent to be blended is an organic acid such as p-toluenesulfonic acid or n-butyl phosphate, a metal salt of organic acid such as tin naphthenate, dibutyltin dilaurate, iron stearate or lead octenoate, an organic amine such as isophoronediamine, methylenediamine or imidazole, and used in an amount of 0.1 to 5% by weight, preferably 0.2 to 1% by weight. In the Examples of the U.S. patent, measurement of pot life is conducted under conditions where a mixture of the organosilane polymer, the hydrolyzable reactive silane monomer and the curing agent is kept in a sealed container. Therefore, there is no description concerning the pot life in open system measured in the present invention, which is practically important. In fact, when measuring the pot life of the mixture described in the U.S. patent, i.e. a mixture of the organosilane polymer, the hydrolyzable reactive silane monomer and the curing agent, in open system, sufficient pot life can be obtained only when an organic amine is used. When other curing agents are used, the pot life in open system is short. There is also a problem in case an organic amine is used, however, in that the cured resin is colored due to the organic amine. Accordingly, development of another curing catalyst system has been desired.

From such viewpoint, there was proposed a curing catalyst system comprising a particular curing agent which contains an organotin compound (Japanese Unexamined Patent Publication (Tokkyo Kokai) No. 63351/1982), which shows technical progress in this art. However, a curing catalyst system having a high curing activity and a long pot life has not yet been developed.

As a result of the inventors' intensive study, a curable composition having a high curing activity and a long pot life has been found, and the present invention has been completed.

SUMMARY OF THE INVENTION

According to the present invention, there can be provided a curing composition having a high curing activity and a long pot life, which comprises:
(a) an organic polymer containing at least one silicon-containing hydrolyzable group in the polymer molecule,
(b) an acidic phosphoric acid compound containing

bond in the molecule, and
(c) an organozirconium compound.

DETAILED DESCRIPTION

The organic polymer (a) containing at least one silicon-containing hydrolyzable group in the polymer molecule is an organic polymer which contains at least silicon-containing hydrolyzable group per one polymer molecule at an end of the main chain or in a branched chain. Examples of the main chain of the polymer are, for instance, alkyleneoxide polymers, ether-ester block copolymers, vinyl polymers, diene polymers, and the like.

The organic polymer (a) which contains an alkyleneoxide polymer or an ether-ester block copolymer can be prepared according to the processes described in Japanese Examined Patent Publication (Tokkyo Kokoku) No. 36319/1970, No. 12154/1971 and No. 32673/1974, and Japanese Unexamined Patent Publication (Tokkyo Kokai) No. 156599/1975, No. 73561/1976, No. 6096/1979, No. 3768/1980, No. 82123/1980, No. 123620/1980, No. 125121/1980, No. 131021/1980, No. 131022/1980, No. 135135/1980 and No. 137129/1980, and the like. The organic polymer (a) which contains a vinyl polymer or a vinyl copolymer can be prepared according to the processes described in Japanese Examined Patent Publication (Tokkyo Kokoku) No. 28301/1976, Japanese Unexamined Patent Publication (Tokkyo Kokai) No. 36395/1979, No. 123192/1979, No. 179210/1982, and the like. The organic polymer (a) which contains a diene polymer can be prepared according to the processes described in Japanese Examined Patent Publication (Tokkyo Kokoku) No. 17553/1970 and Japanese Examined Patent Publication (Tokkyo Kokai) No. 1389/1972, and the like.

The term "silicon-containing hydrolyzable group" as used herein means a group which is subjected to condensation reaction in the presence of moisture or a crosslinking agent, if necessary, by using a catalyst. Examples of the silicon-containing hydrolyzable group are, for instance, a silicon-containing group wherein a silicon atom is bonded to a hydrolyzable group and a silanol group, and a typical example thereof is a group represented by the formula:

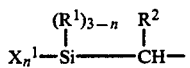

wherein $X^1$ is a hydrolyzable group, $R^1$ and $R^2$ are hydrogen or a monovalent hydrocarbon group having 1 to 10 carbon atoms selected from an alkyl group, an aryl group and an arylalkyl group, "n" is an integer of 1 to 3.

Among the above-mentioned organic polymers (a), the vinyl resins containing a silyl group can be prepared by various processes. Particularly the following processes are effective on an industrial scale.

(1) Process wherein a vinyl resin having a carbon-carbon double bond is reacted with hydrosilane (hydrosilylation reaction).

(2) Process wherein a vinyl resin is reacted with a silyl compound having a polymerizable double bond.

Process (1)

The vinyl resin containing a silyl group can be easily prepared by reacting a hydrosilane compound with a vinyl resin having a carbon-carbon double bond in the presence of a transition metal of the VIII group of Periodic Table as a catalyst.

The hydrosilane compounds usable in the present invention are represented by the formula:

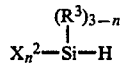

wherein $R^3$ is a monovalent hydrocarbon group having 1 to 10 carbon atoms selected from an alkyl group, an aryl group and an arylalkyl group, $X^2$ is a hydrolyzable group selected from a halogen atom, an alkoxy group, an acyloxy group, an aminoxy group, a phenoxy group, a thioalkoxy group and an amino group, "n" is an integer of 1 to 3.

Examples of the hydrosilane compound included in the compounds of the above formula are, for instance, halogenized silanes such as methydichlorosilane, trichlorosilane and phenyldichlorosilane; alkoxysilanes such as methyldiethoxysilane, methyldimethoxysilane, phenyldimethoxysilane, trimethoxysilane and triethoxysilane; acyloxysilanes such as methyldiacetoxysilane, phenyldiacetoxysilane and triacetoxysilane; aminoxysilanes such as methyldiaminoxysilane and triaminoxysilane; aminosilanes such as methyldiaminosilane and triaminosilane; and the like. The hydrosilane compound can be used in in various proportions to the carbon-carbon double bond content of the vinyl resin, preferably in an amount of 0.5 to 2 moles to one mole of the double bond. Though the hydrosilane compound can be used in an excess amount, the excess hydrosilane compound is merely recovered as an unreacted hydrosilane compound.

In addition, in the present invention there can be readily employed a cheap and highly reactive halogenated silane as the hydrosilane compound. When the vinyl resin containing a silyl group prepared by using the halogenated silane is exposed to air, the resin is cured at normal temperature while releasing hydrochloride gas. Therefore, practical use of the vinyl resin from the halogenated silane is limited because the released hydrochloride has a pungent smell and corrodes a contacting or nearby material. Accordingly it is desired that the halogen functional group in the vinyl resin is converted to another hydrolyzable group.

The vinyl resins used in the process (1) are not particularly limited excepting they are vinyl resins containing a hydroxyl group. Examples of the vinyl resins are, for instance, resins mainly containing homopolymers or copolymers of acrylates or methacrylates such as methyl acrylate, methyl methacrylate, ethyl acrylate, ethyl methacrylate, butyl acrylate, butyl methacrylate, 2-ethylhexyl acrylate and 2-ethylhexyl methacrylate; carboxylic acids such as acrylic acid, methacrylic acid, itaconic acid and fumaric acid; acid anhydrides such as maleic acid anhydride; epoxy compounds such as glycidyl acrylate and glycidyl methacrylate; amino compounds such as diethylaminoethyl acrylate, diethylaminoethyl methacrylate and aminoethyl vinyl ether; amide compounds such as acrylamide, methacrylamide, itaconic acid diamide, α-ethylacrylamide, crotonamide, fumaric acid diamide, maleic acid diamide, N-butoxymethylacrylamide and N-butoxymethylmethacrylamide; acrylonitrile; and iminol methacrylate; styrene; α-methylstyrene; vinyl chloride; vinyl acetate; vinyl propionate; and the like. In the preparation of the homopolymers or copolymers of the vinyl compounds, carbon-carbon double bonds for the hydrosilylation reaction can be introduced in the vinyl resins at an end of the polymer chain or in a branched chain by partially radical-copolymerizing allyl acrylate, allyl methacrylate, diallyl phthalate or the like with the vinyl compounds. The amount of the monomer used to introduce the double bond may be determined depending on the number of silyl groups in the desired resin. The molecular weight of the vinyl resin can be controlled by adding a chain transfer agent such as n-dodecylmercaptan or t-dodecylmercaptan. The polymerization of the vinyl compounds can be carried out with or without a solvent.

The reaction of the hydrosilane compound with the carbon-carbon double bond in the present invention requires a catalyst of a transition metal complex. Effective compounds of the transition metal complex are, for instance, complexes of a transition metal of the VIII group selected from platinum, rhodium, cobalt, palladium and nickel. The hydrosilylation reaction can be achieved at a temperature in the range of 50° to 100° C. The reaction time is about 1 to 10 hours.

Process (2)

The process (2) can be accomplished by radical-polymerizing a silane compound of the formula:

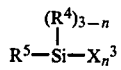

wherein $R^4$ is a monovalent hydrocarbon group having 1 to 10 carbon atoms selected from an alkyl group, an aryl group and an arylalkyl group, $R^5$ is an organic group having a polymerizable double bond, $X^3$ is a hydrolyzable group selected from a hydrogen atom, an alkoxy group, an acyloxy group, an aminoxy group, a phenoxy group, a thioalkoxy group and an amino group, "n" is an integer of 1 to 3, with a vinyl compound.

Examples of the silane compound used in the process (2) are, for instance,

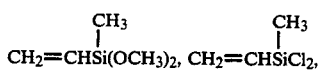

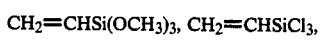

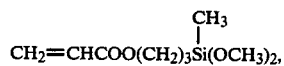

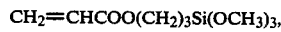

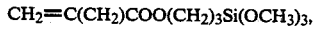

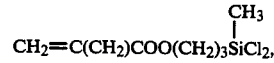

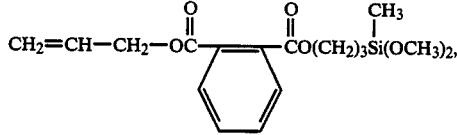

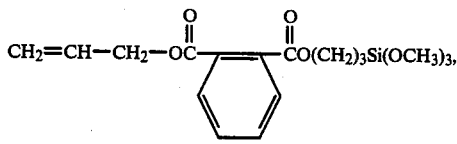

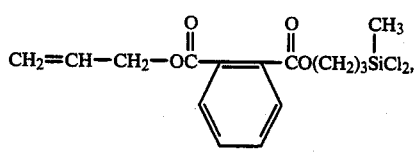

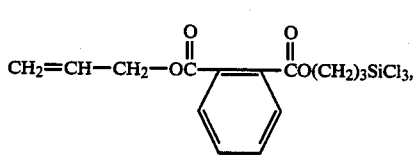

and the like.

The silane compounds can be synthesized by various processes, for instance, by reacting acetylene, allyl acrylate or allyl methacrylate with methyldimethoxysilane or methyldichlorosilane in the presence of a catalyst of a transition metal of the VIII group.

As the vinyl compounds used in the process (2), there can be employed hydroxyl-containing vinyl compounds such as 2-hydroxyethyl acrylate, 2-hydroxyethyl methacrylate, 2-hydroxypropyl acrylate, 2-hydroxypropyl methacrylate, 2-hydroxyvinyl ether, N-methylolacrylamide and Aronix 5700 (commercially available from Toa Gosei Co., Ltd.), in addition to the vinyl compounds used in the preparation of the vinyl resins in the process (1).

The copolymerization of the vinyl compound with the silane compound is carried out by a usual solution polymerization method. The reaction is conducted at 50° to 150° C. by mixing the vinyl compound, the silane compound, a radical initiator, and, if necessary, a chain transfer agent such as n-dodecylmercaptan or t-dodecylmercaptan to obtain a silyl group-containing copolymer having a given molecular weight. A solvent may or may not be used. When used, they are preferably inert solvents such as ethers, hydrocarbons and acetates.

The hydrolyzable group contained in the thus obtained silyl group-containing vinyl resin can be converted to the other hydrolyzable group by a known method.

According to the above-mentioned processes, the silyl group-containing vinyl resins which substantially comprise the vinyl polymer and have at least one silicon-containing group bonding to a hydrolyzable group at an end of the polymer chain or in a branched chain in the molecule can be obtained.

The acidic phosphoric acid compound used in the invention is an acidic phosphoric acid compound containing a

group in the molecule, and may be an organic acid phosphate or a titanate coupling agent containing a

group. Examples of the organic acid phosphate are, for instance, a compound of the formula:

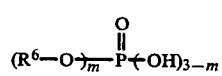

wherein $R^6$ is an organic group, "m" is 1 or 2, such as

-continued

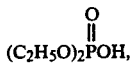

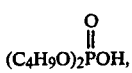

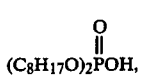

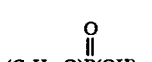

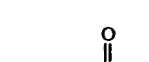

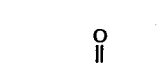

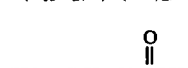

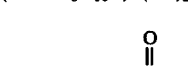

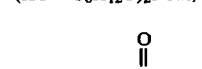

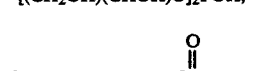

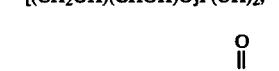

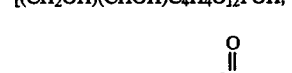

and the like.

Examples of the titanate coupling agent are, for instance,

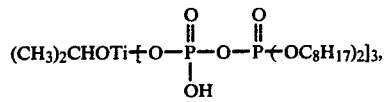

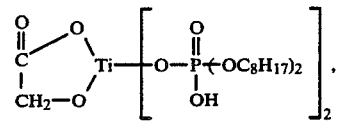

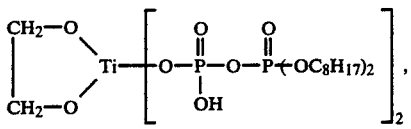

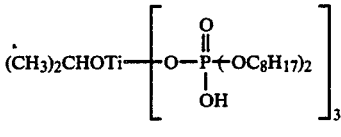

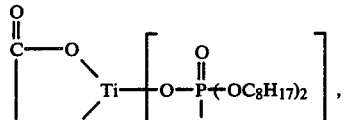

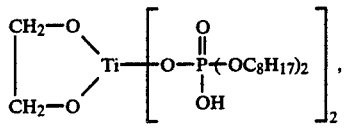

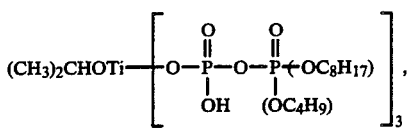

and the like.

The organozirconium compounds (c) used in the present invention are compounds where zirconium is bonded to organic groups, such as zirconium alkoxides, zirconium chelates and zirconium salts of organic acid which may be a monomer or an associated compound. A preferable alkoxide or chelate is a compound of the formula:

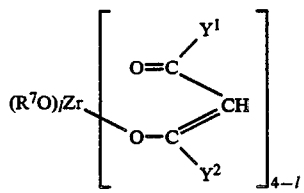

wherein $R^7$ is a monovalent hydrocarbon group having 1 to 20 carbon atoms, $Y^1$ and $Y^2$ are the same or different and each is an amino group or an organic group having 1 to 8 carbon atoms selected from the group consisting of a hydrocarbon group, a halogenated hydrocarbon group, a cyanoalkyl group, a halogenated alkoxy group and a cyanoalkoxy group, "l" is 0, 1, 2, 3 or 4. Nonrestrictive examples of the alkoxide and the chelate are, for instance, $(C_2H_5O)_4Zr$, $(iso-C_3H_7O)_4Zr$, $(n-C_4H_9O)_4Zr$, $(C_8H_{17}O)_4Zr$, $Zr(acac)_4$ wherein "acac" represents acetylacetonate (hereinafter the same), $(n-C_4H_9O)_3Zr(acac)$, $(n-C_4H_9O)_2Zr(acac)_2$, $(n-C_4H_9O)Zr(acac)_3$, and the like. Nonrestrictive examples of the zirconium salt of organic acid are, for instance, $(CH_3CO_2)_2ZrO$, $(C_7H_{15}CO_2)_2ZrO$, $(C_{15}H_{31}CO_2)_2ZrO$, and the like. These organozirconium compounds may be used in the form of an associated compound such as trimer or tetramer.

The kind of organic polymer (a) which contains at least one silicon-containing hydrolyzable group in the molecule is not particularly limited, when using the above-mentioned particular curing catalyst. The amount of the acidic phosphoric acid compound (b) and the amount of the organozirconium compound (c) are both 0.01 to 25 parts by weight, preferably 0.1 to 10 parts by weight to 100 parts by weight of the organic polymer (a). The weight ratio of the acidic phosphoric acid compound (b) to the organozirconium compound (c) is 0:0.1 to 1:20, preferably 1:0.1 to 1:10. The method and order of the addition procedure are not particularly limited, and can be optionally selected. For instance, there are employed a method wherein the acidic phosphoric acid compound (b) is added to the organic polymer (a), and then the organozirconium is added thereto; a method wherein the addition order to the components (b) and (c) is reversed; a method wherein the components (b) and (c) are previously mixed, and then the organic polymer (a) is added thereto.

Accordingly to the above-mentioned process, a curable composition having a rapid curing rate and an improved pot life both in open system and in closed system can be obtained. The pot life can be further improved by adding a trialkyl ortho-formate such as trimethyl ortho-formate or triethyl ortho-formate; a hydrolyzable ester compound such as methyltriethoxysilane, methyltriacetoxysilane, vinyltrimethoxysilane, tetramethyl ortho-silicate or tetraethyl ortho-silicate; an alkyl alcohol such as methyl alcohol, butyl alcohol, amyl alcohol, ethylene glycol monoethyl ether or ethylene glycol monobutyl ether; or the like.

The curable composition of the invention is useful as paints, coating agents, adhesives, sealants, and the like because the composition can be cured at normal temperature or a low temperature. Particularly since the curing composition of the invention has an excellent adhesive property to organic materials, application to a surface of organic material such as wood, paper, plastics or under coating of an organic paint can be achieved, in addition to the use for painting, coating or adhering against inorganic materials. Therefore, the scope of the use can be extremely wide.

Further, when adding a compound such as ethyl silicate which can be co-condensated with the silyl group-containing organic polymer (a), properties such as surface hardness and solvent resistance can be improved. In addition, the curing composition of the invention can be blended with various resins which are used as adhesives, paints, coating agents and sealants. When admixing the composition with lacquer paints, acrylic lacquer paints, thermosetting acrylic paints, alkyd paints, melamine paints and epoxy paints in an appropriate amount, the adhesive property and weatherability of these currently used paints and coatings can be improved.

To the curable composition of the present invention, various fillers and pigments may be added. Examples of the fillers and pigments are, for instance, various silicas, calcium carbonate, magnesium carbonate, titanium oxide, iron oxide, glass fibers, and the like.

The curable composition is also useful as a coating composition and a sealing composition for airplanes, buildings, cars, glass and the like, and a surface treating agent for inorganic materials.

The present invention is more specifically described and explained by means of the following Examples. It is to be understood that the present invention is not limited to the Examples and various changes and modifications may be made in the invention without departing from the spirit and scope thereof.

PREPARATION EXAMPLE 1

To 90 g of xylene heated to 90° C. were added dropwise 30 g of styrene, 16 g of allyl methacrylate, 20 g of methyl methacrylate, 19 g of n-butyl methacrylate, 14 g of butyl acrylate, 4 g of maleic acid anhydride and a solution of 2 g of azobisisobutyronitrile in 2 g of n-dodecylmercaptan. The reaction was carried out for 10 hours to give a vinyl resin containing unsaturated groups of the allyl type (molecular weight: 8000). As a result of IR spectrum analysis, an absorption based on carbon-carbon double bond was observed at 1648 $cm^{-1}$ and an absorption based on acid anhydride was observed at 1780 $cm^{-1}$.

From the obtained resin, 40 g of the solvent was removed under reduced pressure. To 100 g of the vinyl resin containing allyl type unsaturated groups were added 9.4 g of methyldimethoxysilane and an isopropanol solution of 0.0031 g of chloroplatinate, and then the mixture was reacted for 6 hours at 90° C. in a sealed system to give a vinyl resin containing a silyl group. In the IR spectrum chart, the absorption at 1648 $cm^{-1}$ disappeared.

PREPARATION EXAMPLE 2

To 70 g of xylene heated to 90° C. were added dropwise 30 g of styrene, 51 g of γ-methacryloxypropyltrimethoxysilane, 22 g of methyl methacrylate, 18 g of butyl acrylate, 15 g of n-butanol and a solution of 2 g of azobisisobutyronitrile in 0.7 g of n-dodecylmercaptan. The mixture was reacted for 10 hours to give a silyl-containing vinyl resin having a molecular weight of 15,000.

PREPARATION EXAMPLE 3

To 70 g of xylene heated to 90° C. were added dropwise 30 g of styrene, 26 g of methacryloxypropyltrimethoxysilane, 52 g of methyl methacrylate, 27 g of butyl acrylate, 4 g of acrylamide and a solution of 2 g of azobisisobutyronitrile in 0.7 of n-dodecylmercaptan. The mixture was reacted for 10 hours to give a silyl-containing vinyl resin having a molecular weight of 15,000.

EXAMPLES 1 TO 9 AND COMPARATIVE EXAMPLES 1 TO 4

The silyl-containing vinyl resins obtained in Preparation Examples 1 to 3 were diluted with xylene, and then the acidic phosphoric acid esters and the organozirconium compounds shown in Table 1 were added thereto to prepare curable compositions having a solid polymer content of 25% by weight.

A beaker of 100 cc was charged with 35 g of the curable composition, and then the pot life in open system and the curing property were measured. The pot life was evaluated by measuring a period of time when skinning began. The curing property was evaluated by means of thinner-spot test by using coatings prepared by curing for 3 hours at room temperature.

3: Swollen a little
2: Remarkably swollen
1: Dissolved
The results are shown in Table 1.

TABLE 1

| Example | Silyl group-containing vinyl resin | Acidic phosphoric acid Compound Kind | Amount[1] (part by weight) | Organozirconium Compound Kind | Amount[1] (part by weight) | Pot life in open system | Curing property |
|---|---|---|---|---|---|---|---|
| Com. Ex. 1 | Prep. Ex. 1 | Dibutyl phosphate[2] | 1.5 | — | — | Skinned after 2 hr. | — |
| Com. Ex. 2 | Prep. Ex. 2 | Dibutyl phosphate | 1.5 | — | — | Skinned after 15 min. | 5 |
| Com. Ex. 3 | Prep. Ex. 2 | Dioctyl phosphate[3] | 2.0 | — | — | Skinned after 20 min. | 5 |
| Com. Ex. 4 | Prep. Ex. 3 | Dibutyl phosphate | 1.5 | — | — | Skinned after 45 min. | — |
| Ex. 1 | Prep. Ex. 2 | Dibutyl phosphate | 1.5 | Tetrabutoxy-zirconium[4] | 0.5 | Skinned after 1.5 hr. | 5 |
| Ex. 2 | Prep. Ex. 2 | Dibutyl phosphate | 1.5 | Tetrabutoxy-zirconium | 0.75 | No change after 3 hr. | 4 |
| Ex. 3 | Prep. Ex. 2 | Dibutyl phosphate | 1.5 | Butoxyzirconium acetylacetonato[5] | 0.5 | Skinned after 1.0 hr. | 4 |
| Ex. 4 | Prep. Ex. 2 | Dibutyl phosphate[6] | 1.5 | Tetrabutoxy-zirconium[6] | 0.5 | Skinned after 1.5 hr. | 5 |
| Ex. 5 | Prep. Ex. 2 | Dioctyl phosphate | 2.0 | Tetrabutoxy-zirconium | 0.75 | No change after 3 hr. | 4 |
| Ex. 6 | Prep. Ex. 2 | Plenact 1388[7] | 1.5 | Tetrabutoxy-zirconium | 0.5 | No change after 3 hr. | 4 |
| Ex. 7 | Prep. Ex. 3 | Dibutyl phosphate | 1.5 | Tetrabutoxy-zirconium | 0.5 | No change after 3 hr. | — |
| Ex. 8 | Prep. Ex. 3 | Dioctyl phosphate | 1.5 | Tetrabutoxy-zirconium | 0.5 | No change after 3 hr. | — |
| Ex. 9 | Prep. Ex. 1 | Dibutyl phosphate | 1.5 | Tetrabutoxy-zirconium | 0.5 | No change after 12 hr. | — |

[1]Part by weight to 100 parts by weight of the silyl group-containing vinyl resin.
[2]Dibutyl phosphate available from Kabushiki Kaihsa Daihachi Kagaku Kogyosho as a designated name of DP-4.
[3]Dioctyl phosphate available from Kabushiki Kaihsa Daihachi Kagaku Kogyosho as a designated name of DP-8.
[4]Tetrabutoxyzirconium available from Nippon Soda Co., Ltd. as a designated name of TBZR.
[5]Butoxyzirconium acetylacetonato available from Nippon Soda Co., Ltd. as a designated name of Z-75.
[6]Dibutyl phosphate and tetrabutoxyzirconium were previously mixed, and then added to the resin.
[7]Titanate coupling agent available from Ajinomoto Co., Ltd.

The thinner-spot test is the test for measuring a curing property of a coating by dropping a drop of thinner on a cured coating, wiping the surface of the coating with a gauze after 3 minutes from the dropping, and observing the state of the surface of the coating where the thinner fell.

Evaluation was done according to the followings.
5: No change
4: Slightly softened (caved in when pressed with a finger nail)

EXAMPLES 10 TO 11 AND COMPARATIVE EXAMPLE 5

The curing agent and the solvent shown in Table 2 were added to the silyl group-containing vinyl resin obtained in Preparation Example 3 to prepare a single-pack curable composition having a solid polymer content of 25% by weight. The pot life of the composition was measured in closed system. The results are shown in Table 2.

TABLE 2

| Example | Silyl group-containing vinyl resin | Acidic phosphoric acid compound Kind | Amount[1] (part by weight) | Organozirconium compound Kind | Amount[1] (part by weight) | Solvent | Pot life Initial viscosity[2] (sec.) | Viscosity after 14 days at 50° C.[2] (sec.) |
|---|---|---|---|---|---|---|---|---|
| Com. Ex. 5 | Prep. Ex. 3 | Dibutyl phosphate | 1.0 | — | — | Xylene Methyl orthoformate | 10.9 | 17.0 |
| Ex. 10 | Prep. Ex. 3 | Dibutyl phosphate | 1.0 | Tetrabutoxy-zirconium | 0.33 | Xylene Methyl orthoformate | 10.9 | 11.2 |
| Ex. 11 | Prep. Ex. 3 | Dibutyl phosphate | 1.0 | Tetrabutoxy-zirconium | 0.50 | Xylene Methyl orthoformate | 10.9 | 11.7 |

[1]Part by weight to 100 parts by weight of the silyl group-containing vinyl resin.
[2]Viscosity measured by means of Iwata Cup.

In addition to the ingredients used in the Example, other ingredients can be used in the Example as set forth in the specification to obtain substantially the same results.

As is clear from the results in the Examples and Comparative Examples, the curable composition of the present invention can be rapidly cured and has an improved pot life both in open system and in closed system.

What we claim is:

1. A curable composition comprising:
   (a) an organic polymer containing at least one silicon-containing hydrolyzable group at an end of the main chain or in a branch chain of the polymer molecule,
   (b) an acidic phosphoric acid compound containing a

group, and
   (c) an organozirconium compound selected from the group consisting of a zirconium alkoxide, a zirconium chelate, and a zirconium salt of an organic acid.

2. The curable composition of claim 1, wherein the organic polymer has a main chain comprising substantially a vinyl polymer chain, and is a silyl-containing vinyl polymer which has at least one silicon atom at an end of the main chain or in a branched chain in the molecule, said silicon atom being bonded to a hydrolyzable group.

3. The curable composition of claim 1, wherein the organozirconium compound (c) is a compound of the formula:

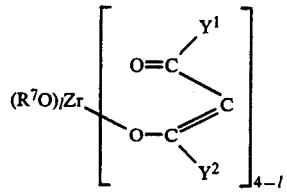

wherein $R^7$ is a monovalent hydrocarbon group having 1 to 20 carbon atoms, $Y^1$ and $Y^2$ are the same or different, and each is an amino group or an organic group having 1 to 8 carbon atoms selected from the group consisting of a hydrocarbon group, a halogenated hydrocarbon group, a cyanoalkyl group, a halogenated alkoxy group and a cyanoalkoxy group, "l" is 0, 1, 2, 3 or 4.

4. The curable composition of claim 1, wherein the acidic phosphoric acid compound (b) is an organic acid phosphate of the formula:

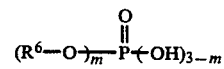

wherein $R^6$ is an organic group, "m" is 1 or 2.

5. The curable composition of claim 1, wherein the acidic phosphoric acid compound and the organozirconium compound are previously mixed.

6. The curable composition of claim 1, wherein the weight ratio of the acidic phosphoric acid compound to the organozirconium compound is 1:0.1 to 1:10.

* * * * *

UNITED STATES PATENT AND TRADEMARK OFFICE
CERTIFICATE OF CORRECTION

PATENT NO. : 4,657,978
DATED : April 14, 1987
INVENTOR(S) : Hiroshi WAKABAYASHI et al It is certified that error appears in the above-identified patent and that said Letters Patent is hereby corrected as shown below:

Column 2, line 40, the formula " $\begin{array}{c} O \\ \parallel \\ -O-P- \\ | \\ H \end{array}$ "

should read -- $\begin{array}{c} O \\ \parallel \\ -O-P- \\ | \\ OH \end{array}$ --.

Signed and Sealed this

Second Day of February, 1988

Attest:

DONALD J. QUIGG

Attesting Officer

Commissioner of Patents and Trademarks